(12) United States Patent
Hirata et al.

(10) Patent No.: US 6,657,220 B2
(45) Date of Patent: Dec. 2, 2003

(54) DISK DETECTING DEVICE USED IN A DISK RECORDING/REPRODUCING SYSTEM AND RESULTANT DISK RECORDING/REPRODUCING SYSTEM

(75) Inventors: Minoru Hirata, Yokohama (JP); Yutaka Hino, Yokohama (JP); Masakazu Hijikata, Sagamihara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 314 days.

(21) Appl. No.: 09/803,737

(22) Filed: Mar. 12, 2001

(65) Prior Publication Data

US 2001/0035505 A1 Nov. 1, 2001

(30) Foreign Application Priority Data

Mar. 17, 2000 (JP) ...................................... P2000-077086

(51) Int. Cl.[7] ............................ G11B 33/10; G11B 7/12; G01N 21/84; G01B 11/00
(52) U.S. Cl. .................... 250/559.4; 250/221; 356/614; 369/217
(58) Field of Search .............................. 250/559.4, 221; 369/53.2, 53.22, 53.3, 184–188, 190, 217, 75.2; 356/614, 615, 622

(56) References Cited

U.S. PATENT DOCUMENTS 3,966,330 A * 6/1976 Ridler et al. .......... 250/559.4 X
5,631,884 A * 5/1997 Chun ....................... 369/30.97
5,644,561 A * 7/1997 Son et al. ..................... 369/58

* cited by examiner

Primary Examiner—Gerard R. Strecker
(74) Attorney, Agent, or Firm—Browdy and Neimark, P.L.L.C.

(57) ABSTRACT

For reducing the number of components used and thereby attaining the reduction of cost and size while ensuring the same disk detecting performance as in the prior art, both light emitting function and light receiving function inherent in an optical pickup are utilized to constitute a disk detecting switch. Only the light emitting function of the optical pickup may be combined with a light receiving element, or only the light receiving function of the optical pickup may be combined with a light emitting element, to constitute a disk detecting switch.

9 Claims, 8 Drawing Sheets

DISK DETECTING DEVICE USED IN A DISK RECORDING/REPRODUCING SYSTEM AND RESULTANT DISK RECORDING/REPRODUCING SYSTEM

BACKGROUND OF THE INVENTION

1. Field of the Invention

The present invention relates to a disk detecting device for use in a recording/reproducing system for a disk such as a compact disk.

2. Description of Prior Art

Figure 1:
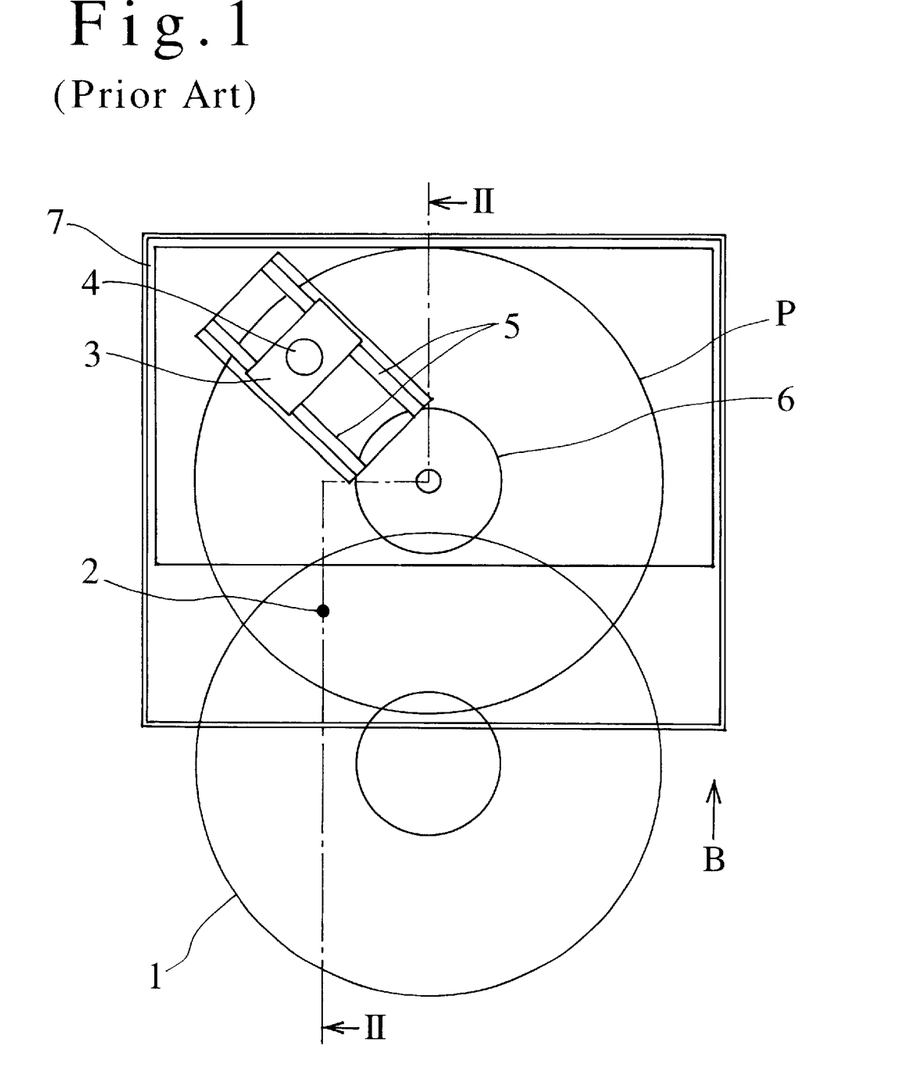
FIG. 1 is a schematic plan view showing the structure of a conventional disk detecting device.

FIG. 1 illustrates a schematic configuration of a disk detecting device used in a conventional compact disk player. In the same figure, a disk 1 having a diameter of 12 cm (an 8 cm dia. disk is also employable) is inserted inside the device in the direction of arrow B from the outside of the device and is subjected to recording or reproducing at a loading position P. A photo type detecting switch 2 is for detecting that the disk 1 has been inserted. Generally, a visible light type or infrared type switch is used as the detecting switch 2. An optical pickup 3 is for recording information onto the disk 1 or for reproducing the recorded information. The optical pickup 3 is provided with a lens portion 4 and slides radially from the center of the disk 1, that is, from an inner periphery to an outer periphery of the disk. Various methods are available for effecting the sliding motion of the optical pickup 3. But in the illustrated example, the optical pickup 3 is mounted on two guide shafts 5. The guide shafts 5 and a spindle motor 6 are secured to a suspension chassis 7. At the loading position P the disk 1 is held by the spindle motor 6 and rotates with rotation of the spindle motor, and recording or reproduction is carried out by the optical pickup 3.

Figure 2:
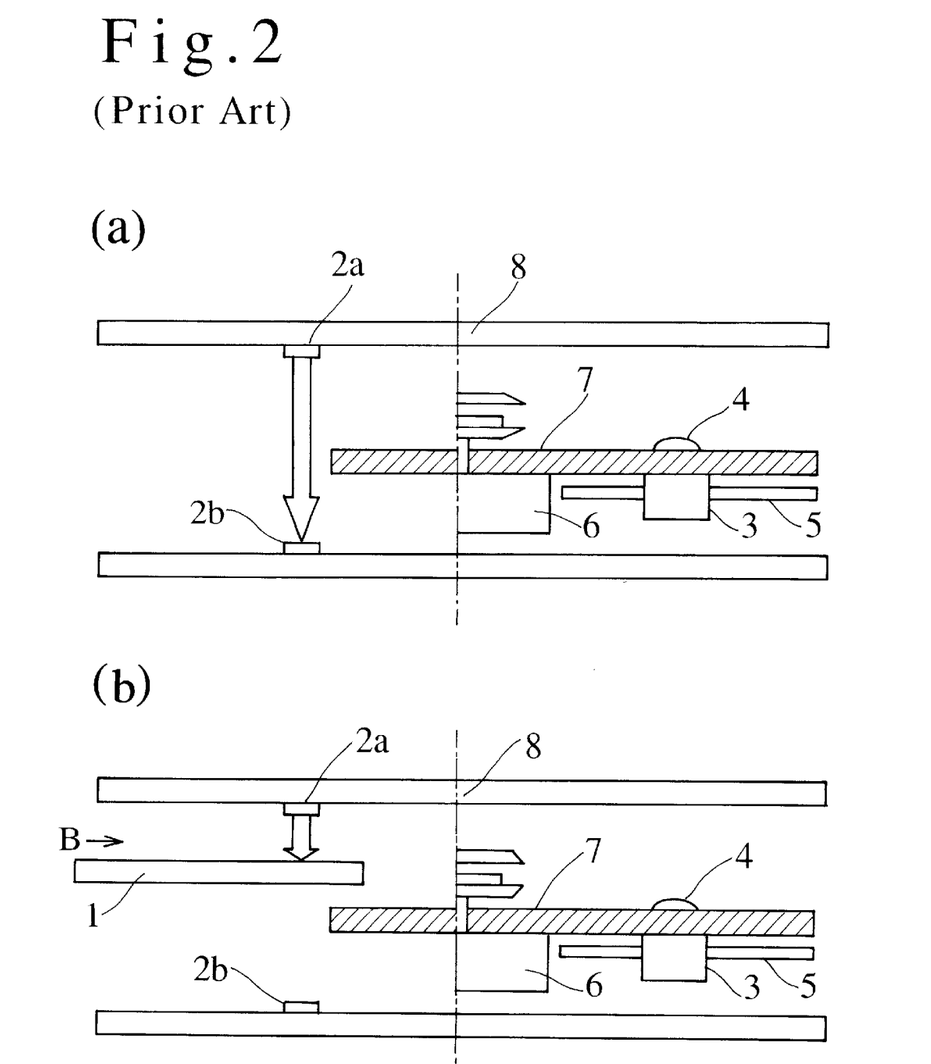
FIG. 2 is a sectional view taken on line II—II in FIG. 1, in which (a) shows the disk detecting device into which a disk has not been inserted and (b) shows the disk detecting device into which a disk has been inserted.

FIG. 2 is a sectional view taken on line II—II in FIG. 1, showing the structure of a conventional disk detecting device. In FIG. 2, (a) shows the disk detecting device not loaded with a disk and (b) shows the disk detecting device loaded with a disk. In FIG. 2, a detecting switch 2 is constituted by a combination of a light emitting element 2a such as a light emitting diode and a light receiving element 2b such as a photo-transistor. The light emitting element 2a and the light receiving element 2b are disposed respectively at upper and lower positions in a vertically sandwiching relation to a disk 1. When light is intercepted between the light emitting element 2a and the light receiving element 2b, the detecting switch 2 outputs an OFF signal, while when light is not intercepted, that is, when light is transmitted, the detecting switch 2 outputs an ON signal. Thus, whether the disk 1 is present or not can be detected on the basis of the position of the detecting switch 2. In this way it is possible to detect whether the disk 1 is loaded into a disk recording/reproducing system 8.

Thus, also according to the conventional disk detecting unit it is possible to detect whether the disk 1 is present or not within the disk recording/reproducing system 8. In a certain system configuration, plural sets of detecting switches 2 are disposed at arbitrary positions. In the example shown in FIG. 2 there is used one set of detecting switch 2.

In the above conventional disk detecting device, however, a detecting switch is needed for detecting a disk and a certain system configuration requires a plurality of detecting switches, with consequent necessity of ensuring a space for disposing such plural detecting switches therein. This is an obstacle to the reduction of cost and size.

SUMMARY OF THE INVENTION

In an aspect of the present invention there is provided a disk detecting device characterized by having a detecting switch for detecting and determining whether a predetermined disk has been inserted into the disk detecting device, the detecting switch being constituted by a combination of a light receiving element and an optical pickup as a light emitting element. According to this configuration it is possible to reduce the cost and size of the device while retaining the same performance as in the prior art.

In an aspect of the present invention there is provided a disk detecting device characterized by having a detecting switch for detecting and determining whether a predetermined disk has been inserted into the disk detecting device, the detecting switch being constituted by a combination of a light emitting element and an optical pickup as a light receiving element. According to this configuration it is possible to reduce the cost and size of the device while retaining the same performance as in the prior art.

In an aspect of the present invention there is provided a disk detecting device characterized by having a detecting switch for detecting and determining whether a predetermined disk has been inserted into the disk detecting device, the detecting switch being constituted by an optical pickup as both a light emitting element and a light receiving element. According to this configuration it is possible to reduce the cost and size of the device while retaining the same performance as in the prior art.

In an aspect of the present invention there is provided, a disk detecting device wherein the light receiving element, the light emitting element and the optical pickup are disposed on a disk insertion port side. According to this configuration it is possible to attain the reduction of cost and size of the device while ensuring the same performance as in the prior art.

In a further aspect of the present invention there is provided a disk detecting device characterized by using a plurality of detecting switches for detecting and determining whether a predetermined disk has been inserted into the disk detecting device, one of the plural detecting switches being the detecting switch described in any of the above-described aspects. According to this configuration it is possible to attain the reduction of cost and size of the device while ensuring the same performance as in the prior art.

In a still further aspect of the present invention there is provided a disk recording/reproducing system using any of the disk detecting devices described above. According to this configuration it is possible to attain the reduction of cost and size of the disk recording/reproducing system while ensuring the same performance as on the prior art.

Accordingly, it is an object of the present invention to provide a disk detecting device and a disk recording/reproducing system both capable of reducing the number of switch components and attaining the reduction of both cost and size while ensuring the same disk detecting function as in the prior art and thereby solve the foregoing conventional problems.

The above object and advantages of the present invention will become more apparent from the following description of embodiments taken in connection with the accompanying drawings.

DESCRIPTION OF THE PREFERRED EMBODIMENTS

First Embodiment

Figure 3:
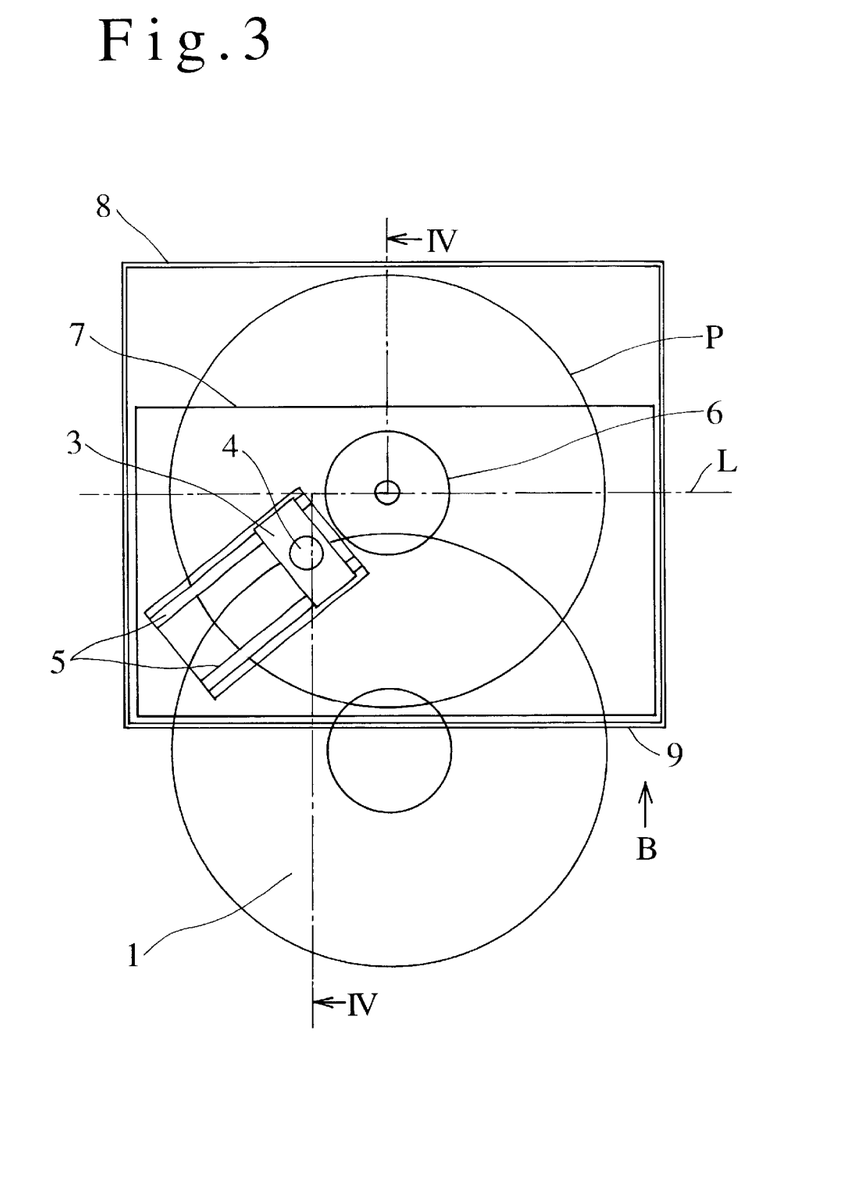
FIG. 3 is a schematic plan view showing the structure of a disk detecting device according to a first embodiment of the present invention.
Figure 4:
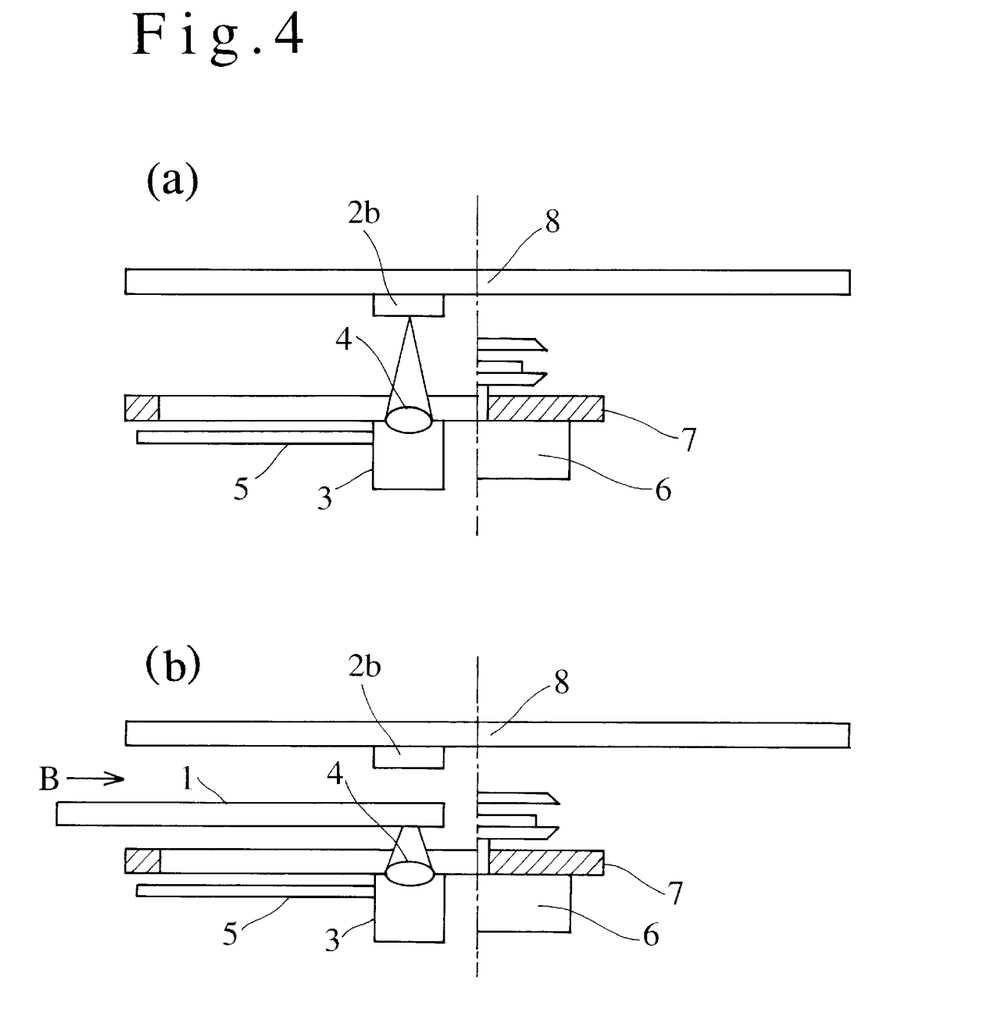
FIG. 4 is a sectional view taken on line IV—IV in FIG. 3, showing the structure of the disk detecting device of the first embodiment, in which (a) shows the disk detecting device into which a disk has not been inserted and (b) shows the disk detecting device into which a disk has been inserted.

FIGS. 3 and 4 illustrate a schematic configuration of a disk detecting device according to a first embodiment of the present invention, in which the same components as in the prior art illustrated in FIGS. 1 and 2 are identified by the same reference numerals as in FIGS. 1 and 2. The first embodiment of the invention is different from the prior art in that a detecting switch used therein is constituted by a combination of a light receiving element 2b and an optical pickup 3. According to this configuration, the position of the optical pickup 3 is changed to a disk insertion port 9 side. More specifically, the optical pickup 3 is disposed in an area from a center line L at a loading position P of a disk 1 up to a disk insertion port 9, whereby at the same position as that of the detecting switch 2 in the prior art it is possible to detect the insertion of the disk 1 immediately. Other mechanisms and constructional points are the same as those illustrated in FIGS. 1 and 2 which relate to the prior art. Generally, in the optical pickup 3, a laser beam is radiated to the disk 1 from a lens 4, reflected beam from the disk is read and is converted to information. In this first embodiment, this light emitting function of the optical pickup 3 is utilized as a light emitting element in the detecting switch.

In a stand-by state of the disk detecting device (disk 1 has been ejected, waiting for the insertion of disk 1), the device stops and stands by at a position (an arbitrary position) at which the device can recognize the disk 1, and upon turning ON of the power, the device begins to emit light. FIG. 4 is a sectional view taken on line IV—IV in FIG. 3, illustrating the structure of the disk detecting device of this embodiment. In FIG. 4, (a) illustrates the disk detecting device into which the disk 1 has not been inserted and (b) illustrates the same device into which the disk has been inserted. In the same figure, the light receiving element 2b is disposed in such a position as it can receive a laser beam which is emitted through the lens 4 in the stand-by position of the optical pickup 3. In the case where the disk 1 has not been inserted into the disk detecting device as in FIG. 4(a), the light receiving element 2b receives the laser beam emitted from the lens 4 and outputs an ON signal. On the other hand, in the case where the disk 1 has been inserted as in FIG. 4(b), the laser beam emitted from the lens 4 of the optical pickup 3 is intercepted by the disk 1 and the light receiving element 2b outputs an OFF signal. In accordance with such ON-OFF signals from the light receiving element 2b a control unit in a disk recording/reproducing system 8 determines whether the disk 1 is present or not.

Thus, according to this first embodiment, since the disk detecting switch is constituted by a combination of the light receiving element 2b with the light emitting function of the optical pickup 3, it is possible to reduce the cost and size of the device.

Second Embodiment

Figure 5:
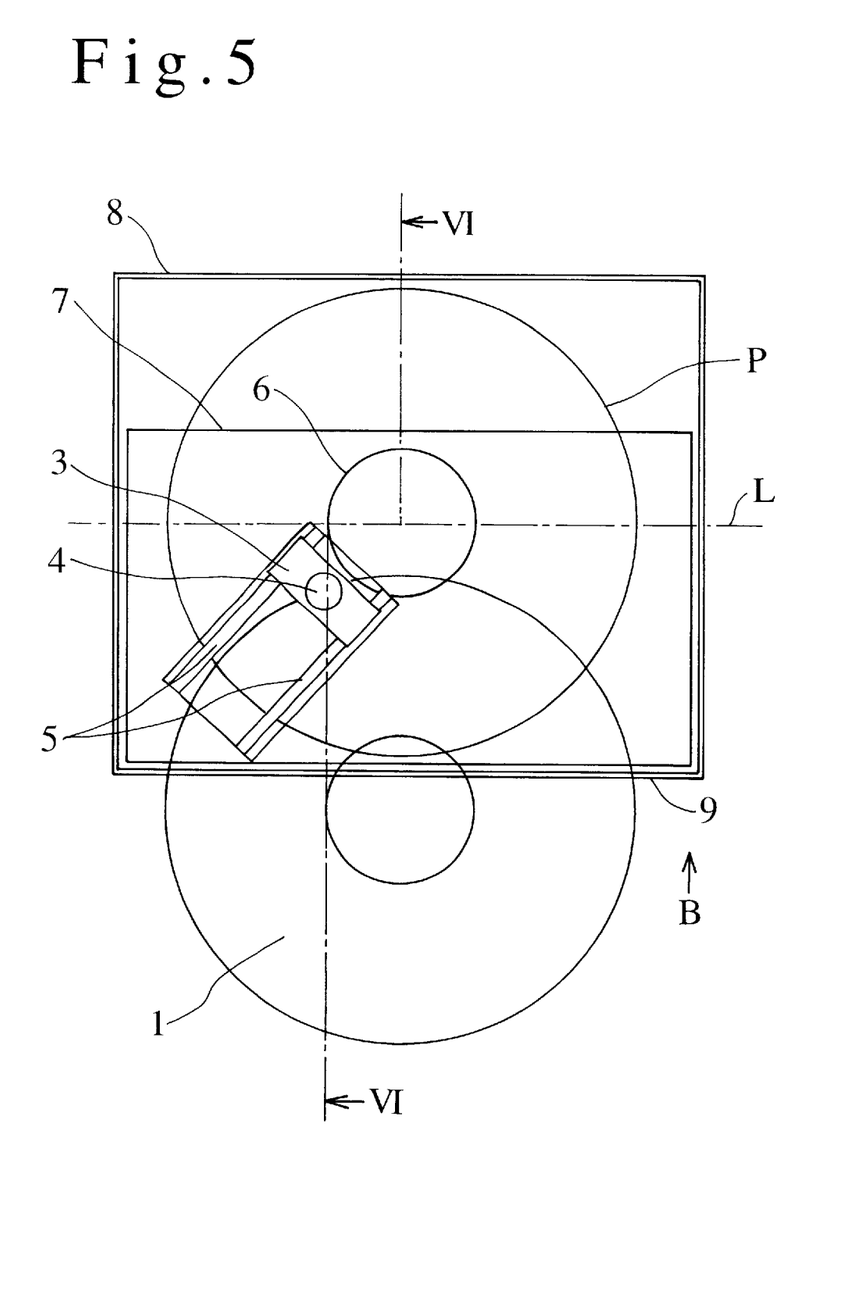
FIG. 5 is a schematic plan view showing the structure of a disk detecting device according to a second embodiment of the present invention.
Figure 6:
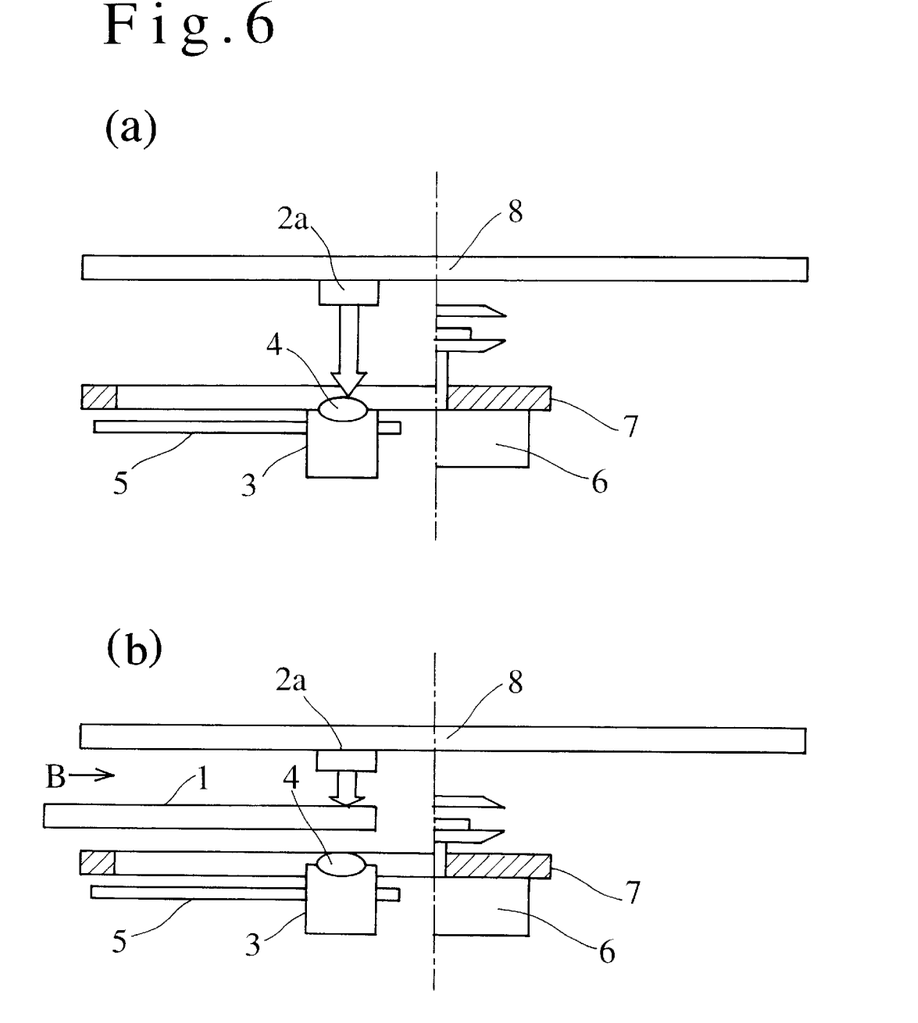
FIG. 6 is a sectional view taken on line VI—VI in FIG. 5, showing the structure of the disk detecting device of the second embodiment, in which (a) shows the disk detecting device into which a disk has not been inserted and (b) shows the disk detecting device into which a disk has been inserted.

FIGS. 5 and 6 illustrate a schematic configuration of a disk detecting device according to a second embodiment of the present invention, in which the same components as in the prior art illustrated in FIGS. 1 and 2 are identified by the same reference numerals as in FIGS. 1 and 2. This second embodiment is different from the prior art in that a detecting switch used therein is constituted by a combination of a light emitting element 2a and an optical pickup 3. According to this configuration, the position of the optical pickup 3 is changed to a disk insertion port 9 side. More specifically, the optical pickup 3 is disposed in an area from a center line L at a loading position P of a disk 1 up to a disk insertion port 9, whereby at the same position as that of the conventional detecting switch 2 it is possible to detect the insertion of the disk 1 immediately. Other mechanisms and constructional points are the same as in FIGS. 1 and 2 which are concerned with the prior art. Generally, in the optical pickup 3, a laser beam is radiated to the disk 1 from the lens 4 and reflected beam from the disk is read and converted to information. In this second embodiment, this light receiving function of the optical pickup 3 is utilized as a light receiving element in the detecting switch.

While the disk detecting device is in a stand-by state (disk 1 has been ejected, waiting for the insertion of disk 1), the optical pickup 3 stops and stands by at a position (an arbitrary position) at which the device can recognize the disk 1, and upon turning ON of the power, only the light receiving function is allowed to be carried out. FIG. 6 is a sectional view taken on line VI—VI in FIG. 5, illustrating the structure of the disk detecting device of this embodiment. In FIG. 6, (a) illustrates the disk detecting device into which the disk 1 has not been inserted and (b) illustrates the same device into which the disk has been inserted. In the same figure, the light emitting element 2a is disposed in such a position as permits the optical pickup 3 to receive light emitted from the light emitting element in the stand-by position of the optical pickup, and upon turning ON of the power, the light emitting element 2a begins to emit light. With the disk 1 not inserted as in FIG. 6(a), the light emitted from the light emitting element 2a is received by the lens 4 of the optical pickup 3, which in turn outputs an ON signal. With the disk 1 inserted as in FIG. 6(b), the light emitted from the light emitting element 2a is intercepted by the disk 1 and the optical pickup 3 outputs an OFF signal. In accordance with such ON-OFF signals from the optical pickup 3 a control unit in a disk recording/reproducing system 8 determines whether the disk 1 is present or not.

Thus, according to this embodiment, since the disk detecting switch is constituted by a combination of the light emitting element 2a with the light receiving function of the optical pickup 3, it is possible to attain the reduction of cost and size of the device.

Third Embodiment

Figure 7:
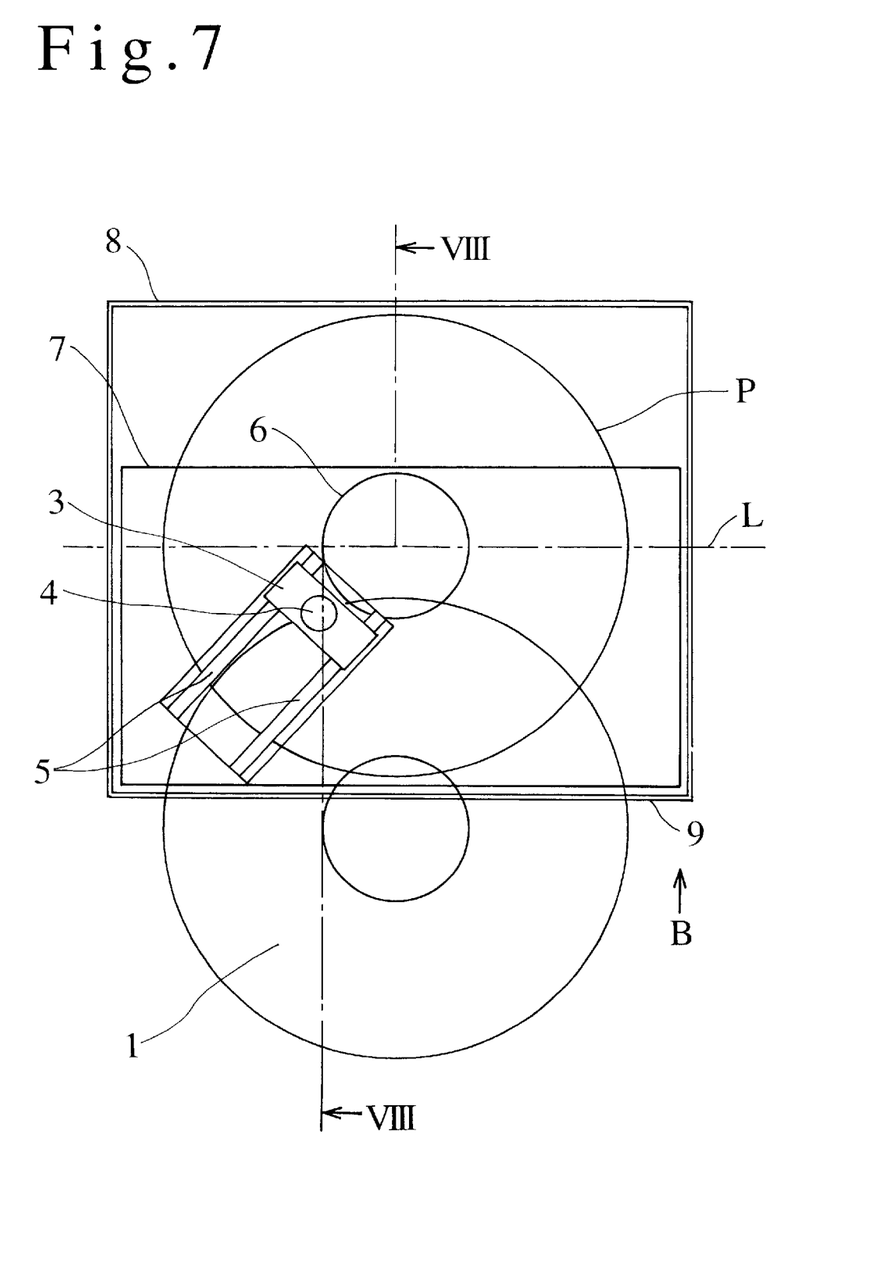
FIG. 7 is a schematic plan view showing the structure of a disk detecting device according to a third embodiment of the present invention.
Figure 8:
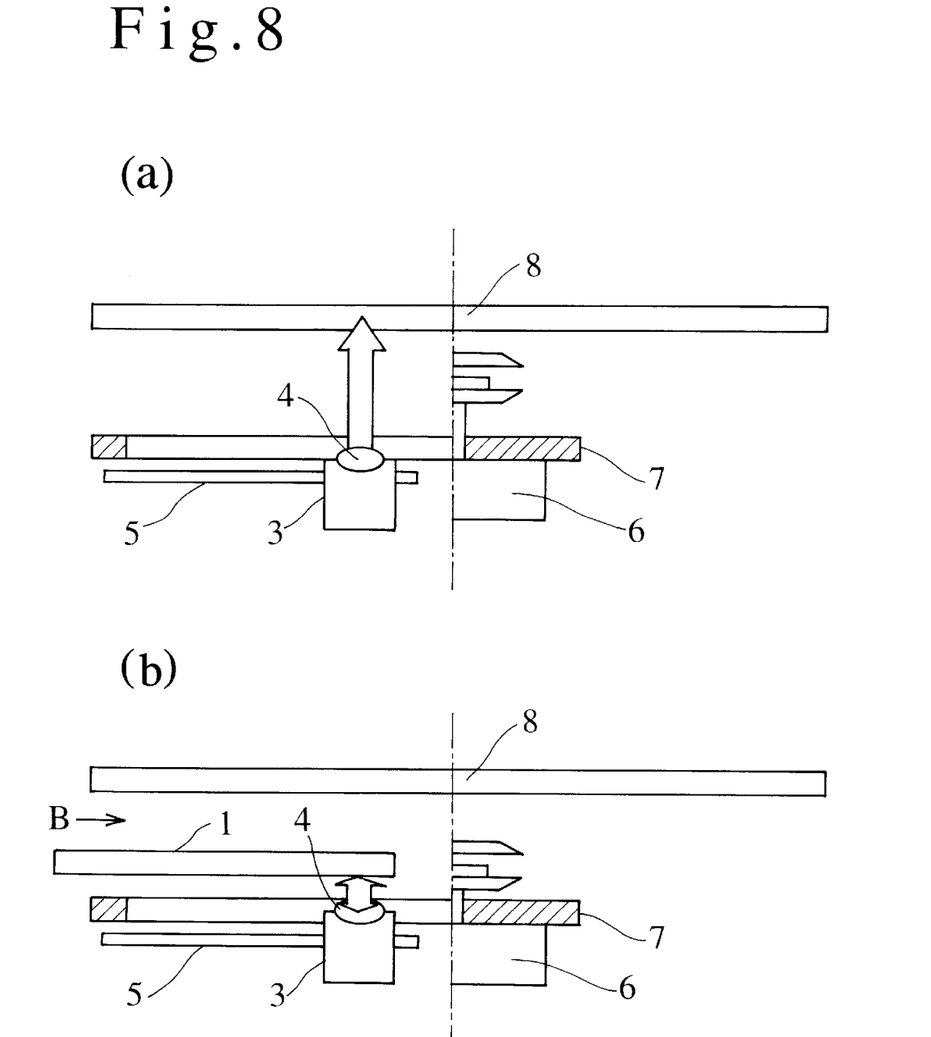
FIG. 8 is a sectional view taken on line VIII—VIII in FIG. 7, showing the structure of the disk detecting device of the third embodiment, in which (a) shows the disk detecting device into which a disk has not been inserted and (b) shows the disk detecting device into which a disk has been inserted.

FIGS. 7 and 8 illustrate a schematic configuration of a disk detecting device according to the third embodiment of the present invention, in which the same components as in the prior art illustrated in FIGS. 1 and 2 are identified by the same reference numerals as in FIGS. 1 and 2. This third embodiment is different from the prior art in that a detecting switch used therein is constituted by utilizing only the functions of an optical pickup 3. According to this configuration, the position of the optical pickup 3 is changed to a disk insertion port 9 side. To be more specific, the optical pickup 3 is disposed in an area from a center line L at a loading position P of a disk 1 up to a disk insertion port 9, whereby at the same position as that of the conventional detecting switch 2 it is possible to detect the insertion of the disk 1 immediately. Other mechanisms and constructional points are the same as in the prior art illustrated in FIGS. 1 and 2. Generally, in the optical pickup 3, a laser beam is radiated from a lens 4 to the disk 1 and reflected beam from the disk is read and converted to information. The detecting switch in this third embodiment utilizes both such light emitting function and light receiving function of the optical pickup 3.

In a stand-by state of the disk detecting device (disk 1 has been ejected, waiting for the insertion of disk 1), the optical pickup 3 stops and stands by at a position (an arbitrary position) at which the device can recognize the disk 1, and upon turning ON of the power, the optical pickup begins to emit light. FIG. 8 is a sectional view taken on line VIII—VIII in FIG. 7, illustrating the structure of the disk detecting device of this embodiment. In FIG. 8, (a) illustrates the disk detecting device into which the disk 1 has not been inserted and (b) illustrates the same device into which the disk has been inserted. In the case where the disk 1 has not been inserted into the disk detecting device as in FIG. 8(a), a laser beam emitted from the optical pickup 3 is not reflected because the disk 1 is not present, and the optical pickup 3 outputs an OFF signal. On the other hand, when the disk 1 has been inserted into the disk detecting device as in FIG. 8(b), a laser beam emitted from the optical pickup 3 is reflected by the disk 1 and is received by the lens 4 of the optical pickup, whereupon the optical pickup outputs an ON signal. In accordance with such ON-OFF signals from the optical pickup 3 a control unit in a disk recording/reproducing system 8 determines whether the disk 1 is present or not.

Thus, in this third embodiment, since the disk detecting switch is constituted by utilizing both light emitting function and light receiving function of the optical pickup 3, it is possible to attain the reduction of cost and size of the device.

In the case of a system which requires the use of plural detecting switches, there is used, as one of the required detecting switches, a detecting switch which uses the optical pickup described in any of the above first to third embodiments.

According to the present invention, since a light receiving element and the light emitting function of an optical pickup are combined together to constitute a disk detecting switch, it is possible to omit the use of a dedicated light emitting element while ensuring the same disk detecting function as in the prior art. This reduction in the number of components used permits the attainment of both reduction of cost and reduction of space, i.e., reduction of size.

According to the present invention, since a light emitting element and the light receiving function of an optical pickup are combined together to constitute a disk detecting switch, it is possible to omit the use of a dedicated light receiving element while ensuring the same disk detecting function as in the prior art. Because of this reduction in the number of components used it is possible to attain both the reduction of cost and the reduction of space, i.e., reduction of size.

According to the present invention, moreover, since both light emitting function and light receiving function of an optical pickup are utilized to constitute a disk detecting switch, the components (both light emitting element and light receiving element) used in the conventional disk detecting switch can be omitted while ensuring the same disk detecting function as in the prior art, whereby it is possible to attain both the reduction of cost and the reduction of space.

Further, according to the present invention, by using the disk detecting device of the invention in a disk recording/reproducing system, both cost reduction and size reduction can be attained while leaving the disk detecting function intact.

Although the present invention has been described above on the basis of its preferred embodiments illustrated in the drawings, it should be readily clear to those skilled in the art that the invention may be readily subjected to changes and modifications. Such changes and modifications are also included in the scope of the present invention.

What is claimed is:

1. A disk detecting device used in a disk recording/reproducing system, comprising:

a means for inserting a disk inside the recording/reproducing system from the outside of the system;

an optical pickup for recording information onto the disk or reproducing the information recorded in the disk, set at a loading position P;

said optical pickup being located at a position where the optical pickup stops at a stand-by position at which the optical pickup can recognize the disk in a disk insertion port side, and the optical pickup begins to emit light upon turning ON the power;

a light receiving element positioned above the optical pickup, which can receive light emitted from the optical pickup;

wherein insertion of the disk is detected in accordance with signals from the light receiving element in a manner that in the case where the disk has been inserted into the disk detecting device, the laser beam emitted from the optical pickup is intercepted by the disk and is not received by the light receiving element, and in the case where the disk is not inserted into the disk detecting device, the light receiving element receives the laser beam emitted from the optical pickup.

2. A disk detecting device used in a disk recording/reproducing system, comprising:

a means for inserting a disk inside the recording/reproducing system from the outside of the system;

an optical pickup for recording information onto the disk or reproducing the information recorded in the disk set at a loading position P;

said optical pickup being located at a position where the optical pickup stops at a stand-by position at which the optical pickup can recognize the disk in a disk insertion port side, and the optical pickup functions as a light receiving element upon turning ON of the power;

a light emitting element positioned above the optical pickup, which can emit light to the optical pickup;

wherein insertion of the disk is detected in accordance with signals from the optical pickup functioning as a light receiving element in a manner that in the case where the disk has been inserted into the disk detecting device, the laser beam emitted from the light emitting element is intercepted by the disk and is not received by the optical pickup, and in the case where the disk is not inserted into the disk detecting device, the optical pickup receives the laser beam emitted from the light emitting element.

3. A disk detecting device used in a disk recording/reproducing system, comprising:

a means for inserting a disk inside the recording/reproducing system from the outside of the system;

an optical pickup for recording information onto the disk or reproducing the information recorded in the disk set at a loading position P;

said optical pickup being located at a position where the optical pickup stops at a stand-by position at which the optical pickup can recognize the disk in a disk insertion port side, and the optical pickup functions as both a light emitting element and a light receiving element upon turning ON of the power;

wherein insertion of the disk is detected in accordance with signals from the optical pickup functioning as both a light emitting element and a light receiving element in a manner that in the case where the disk has been inserted into the disk detecting device, the laser beam emitted from the optical pickup is reflected by the disk and is received by the optical pickup, and in the case where the disk is not inserted into the disk detecting device, a laser beam emitted from the optical pickup is neither reflected by the disk nor the optical pickup receives the reflected laser beam.

4. A disk detecting device according to claim 1, wherein the light receiving element and the optical pickup are disposed in an area from a center line L at a loading position P of a disk up to a disk insertion port.

5. A disk detecting device according to claim 2, wherein the light emitting element and the optical pickup are disposed in an area from a center line L at a loading position P of a disk up to a disk insertion port.

6. A disk detecting device according to claim 3, wherein the optical pickup is disposed in an area from a center line L at a loading position P of a disk up to a disk insertion port.

7. A disk recording/reproducing system, comprising:

a means for inserting a disk inside the recording/reproducing system from the outside of the system;

a rotating driving means holding and rotating disk at the loading position P;

an optical pickup for recording information onto the disk or reproducing the information recorded in the disk by emitting laser beam to the disk; and, a disk detecting device having a light receiving element positioned above the optical pickup, which can receive light emitted from the optical pickup; in which, said optical pickup being located at a position where the optical pickup stops at a stand-by position at which the optical pickup can recognize the disk in a disk insertion port side, and the optical pickup begins to emit light upon turning ON of the power;

wherein insertion of the disk is detected in accordance with signals from the light receiving element in a manner that in the case where the disk has been inserted into the disk detecting device, the laser beam emitted from the optical pickup is intercepted by the disk and is not received by the light receiving element, and in the case where the disk is not inserted into the disk detecting device, the light receiving element receives the laser beam emitted from the optical pickup.

8. A disk recording/reproducing system, comprising:

a means for inserting a disk inside the recording/reproducing system from the outside of the system;

a rotating driving means holding and rotating disk at the loading position P;

an optical pickup for recording information onto the disk or reproducing the information recorded in the disk by emitting laser beam to the disk; and, a disk detecting device having a light emitting element positioned above the optical pickup, which can emit light to the optical pickup; in which, said optical pickup being located at a position where the optical pickup stops at a stand-by position at which the optical pickup can recognize the disk in a disk insertion port side, and the optical pickup functions as a light receiving element upon turning ON of the power;

wherein insertion of the disk is detected in accordance with signals from the optical pickup functioning as a light receiving element in a manner that in the case where the disk has been inserted into the disk detecting device, the laser beam emitted from the light emitting element is intercepted by the disk and is not received by the optical pickup, and in the case where the disk is not inserted into the disk detecting device, the optical pickup receives the laser beam emitted from the light emitting element.

9. A disk recording/reproducing system, comprising:

a means for inserting a disk inside the recording/reproducing system from the outside of the system;

a rotating driving means holding and rotating disk at the loading position P;

an optical pickup for recording information onto the disk or reproducing the information recorded in the disk by emitting laser beam to the disk; and, a disk detecting device having the optical pickup which has both a light emitting function and a light receiving function; in which, said optical pickup being located at a position where the optical pickup stops at a stand-by position at which the optical pickup can recognize the disk in a disk insertion port side, and the optical pickup functions as both a light emitting element and a light receiving element upon turning ON of the power;

wherein insertion of the disk is detected in accordance with signals from the optical pickup as both a light emitting element and a light receiving element in a manner that in the case where the disk has been inserted into the disk detecting device, the laser beam emitted from the optical pickup is reflected by the disk and is received by the optical pickup, and in the case where the disk is not inserted into the disk detecting device, the laser beam emitted from the optical pickup is neither reflected by the disk nor the optical pickup receives the reflected laser beam.

* * * * *